US012645474B1

(12) United States Patent
Thorson et al.

(10) Patent No.: US 12,645,474 B1
(45) Date of Patent: Jun. 2, 2026

(54) TECHNIQUES FOR LANGUAGE SYNCING AND ADAPTATION WHEN PAIRING A PORTABLE COMMUNICATION DEVICE WITH AN ACCESSORY DEVICE

(71) Applicant: Relay, Inc., Raleigh, NC (US)

(72) Inventors: Dean Thorson, Grayslake, IL (US);
Bokchain Koh, Crystal Lake, IL (US);
John Brock Preston, Leesburg, FL (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/538,093

(22) Filed: Feb. 12, 2026

(51) Int. Cl.
| | |
|---|---|
| *G06F 8/36* | (2018.01) |
| *G06F 3/16* | (2006.01) |
| *G06F 9/451* | (2018.01) |
| *G06F 12/0897* | (2016.01) |
| *G06F 16/638* | (2019.01) |
| *G08B 21/04* | (2006.01) |
| *H04W 4/80* | (2018.01) |

(52) U.S. Cl.
CPC .............. *G06F 9/454* (2018.02); *G06F 3/162* (2013.01); *H04W 4/80* (2018.02); *G06F 16/639* (2019.01); *G08B 21/043* (2013.01)

(58) Field of Classification Search
CPC ....... G08B 21/043; G06F 16/639; G06F 8/36; G06F 12/0897

USPC ...................................................... 455/456.6
See application file for complete search history.

(56) References Cited

U.S. PATENT DOCUMENTS

| | | | |
|---|---|---|---|
| 2014/0066000 A1* | 3/2014 | Butler .................. | G08B 21/043 |
| | | | 455/456.6 |
| 2016/0232451 A1* | 8/2016 | Scherzer ............... | G06F 16/639 |

* cited by examiner

*Primary Examiner* — Farzad Kazeminezhad
(74) *Attorney, Agent, or Firm* — Gregory Stephans

(57) ABSTRACT

Disclosed are techniques for synchronizing the language associated with a Bluetooth enabled primary wireless portable device with the language associated with a set of pre-recorded audio messages stored on a Bluetooth accessory device. A Bluetooth connection is established between the primary portable device and the accessory device. The primary portable device queries the accessory device to determine what languages are associated with a set of pre-recorded audio messages on the accessory device. The languages associated with a set of pre-recorded audio messages on the accessory device are compared with the language associated with the primary portable device to determine if any of the languages supported by the accessory device match the language associated with the primary portable device. If different, the primary portable device obtains and forwards to the accessory device the set of pre-recorded audio messages in the language associated with the primary portable device. The accessory device receives and stores the set of pre-recorded audio messages in the language associated with the primary portable device in a secondary storage location within the accessory device.

17 Claims, 5 Drawing Sheets

Figure 5:
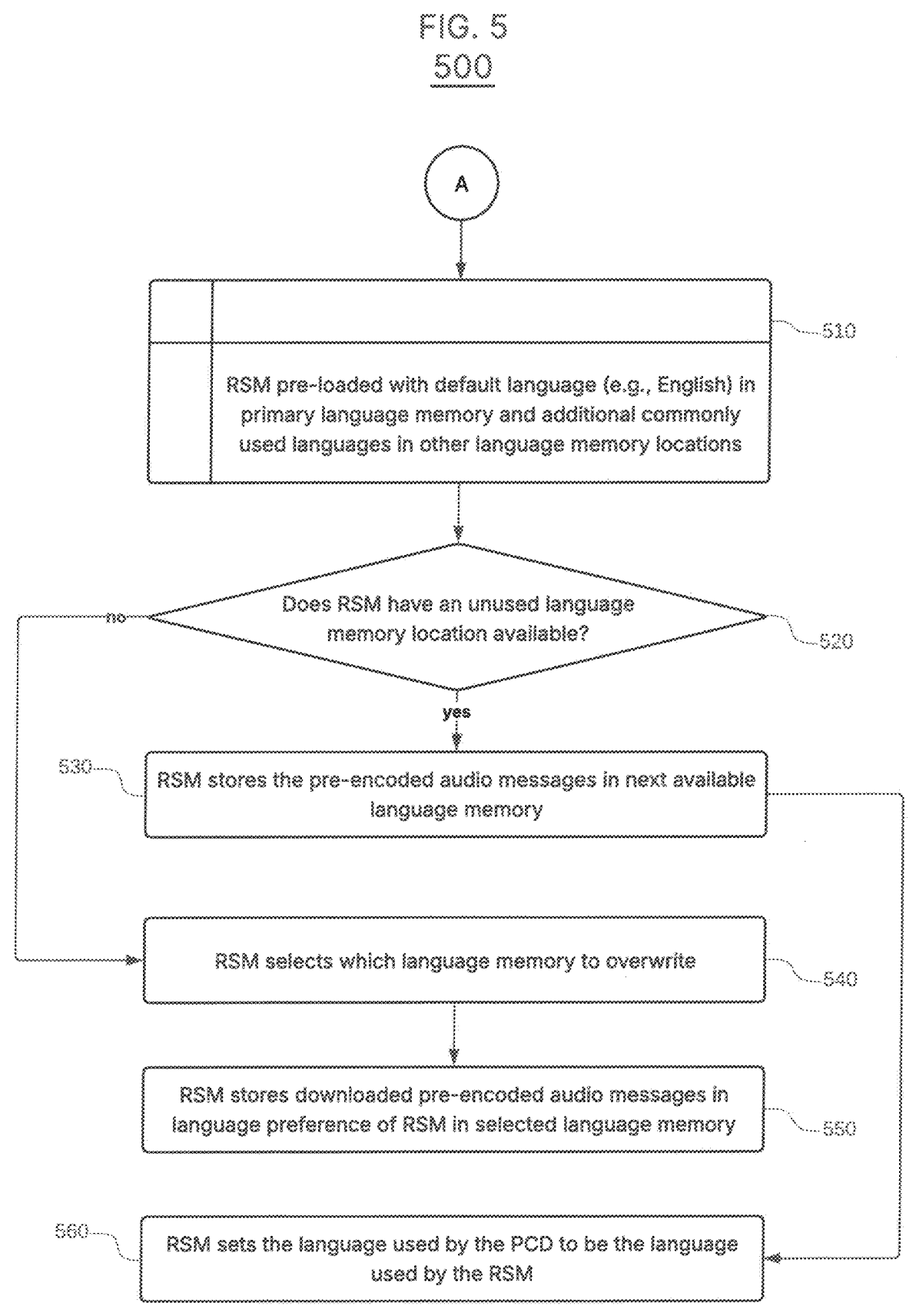

RSM pre-loaded with default language (e.g., English) in primary language memory and additional commonly used languages in other language memory locations — 510

Does RSM have an unused language memory location available? — 520 no yes

RSM stores the pre-encoded audio messages in next available language memory — 530

RSM selects which language memory to overwrite — 540

RSM stores downloaded pre-encoded audio messages in language preference of RSM in selected language memory — 550

RSM sets the language used by the PCD to be the language used by the RSM — 560

TECHNIQUES FOR LANGUAGE SYNCING AND ADAPTATION WHEN PAIRING A PORTABLE COMMUNICATION DEVICE WITH AN ACCESSORY DEVICE

BACKGROUND OF THE INVENTION

Portable communication devices (PCDs), such as two-way radios or smartphones, frequently employ accessory devices like remote speaker/microphone devices (RSMs) to enhance audio input/output, especially when the PCD's built-in microphone and speaker are inadequate. Often, these RSMs are wireless and require an RF link such as Bluetooth to connect with the PCD. In normal operation, when an RSM is powered on, it plays an English phrase like, "powering on". English is typically the default language for such pre-programmed phrases. Other pre-programmed phrases may include things like, "battery low" or "connected".

In many instances, users may not use English as their preferred language. Thus, the pre-programmed phrases would be meaningless.

In some cases, the PCD may be configured to the language of choice for the user such that pre-programmed phrases are stored in multiple languages on the device and will play in the preferred language. If the RSM is coupled to the PCD by a cable, the issue disappears because system audio to the RSM is sourced from the PCD which is already set to the preferred language. For wireless RSMs, the RSM is not connected via cable to the PCD. In a wireless Bluetooth version, the RSM likely has certain operations that occur before a connection is established to a PCD (or after dropping the Bluetooth link). Once the Bluetooth connection is established, system audio is again sourced from the PCD in the preferred language but local audio operation (e.g., battery status) may be a different language. That may cause in a language mismatch between the system audio (PCD) and local audio (RSM) resulting in confusion to the user. However, prior to or subsequent to establishing the Bluetooth connection, the RSM will play relevant pre-programmed messages in the default language—typically English—that the user may not understand. If the message instructs the user to take an action or states a condition that prevents the operation of the RSM, the user will not understand the problem.

There are two types of audio at play. There is system audio which is controlled and sourced by the PCD or the broader system platform comprising the actual audio of any message content as well as system generated prompts or phrases like channel names or phrases pertaining to the PCD itself like battery status. There is also local audio comprising words or phrases pertaining to just the accessory device (e.g., RSM) like its battery status, connection status, power status, etc. Local audio is not sourced from either the PCD or the cloud based system platform. Rather, it is sourced by the local accessory device itself. If the languages of the system audio and local audio are not the same, it can be difficult for the user.

What is needed is a system and method for syncing the language of the accessory device (e.g., RSM) with the primary device (e.g., PCD) such that the user of the primary device will receive messages and notifications on the accessory device in their preferred language that has been associated with the primary device.

SUMMARY OF THE INVENTION

In certain embodiments, there is disclosed a method of synchronizing a language associated with a Bluetooth enabled primary wireless portable device with a language associated with a set of pre-recorded audio messages stored on a Bluetooth accessory device. In the primary portable device, a connection is established with an accessory device, wherein the accessory device includes a set of pre-recorded audio messages in a default language stored in a primary storage location within the accessory device.

The primary portable device queries the accessory device to determine what language is associated with the set of pre-recorded audio messages on the accessory device. The primary device then compares the language associated with a set of pre-recorded audio messages on the accessory device with a language associated with the primary portable device to determine if the language supported by the accessory device matches the language associated with the primary portable device.

If the language supported by the accessory device does not match the language associated with the primary portable device, the primary portable device obtains a set of pre-recorded audio messages in the language associated with the primary portable device. It then forwards the set of pre-recorded audio messages in the language associated with the primary portable device to the accessory device. The accessory device then stores the set of pre-recorded audio messages in the language associated with the primary portable device in a storage location within the accessory device.

The connection resulting from establishing a connection with an accessory device can be a Bluetooth connection or a direct cable connection such as, for instance, a USB type cable.

The pre-recorded audio messages are associated with triggering events and provide information regarding the status of the accessory device.

The storage location within the accessory device in which the set of pre-recorded audio messages in the language associated with the primary portable device are stored may be a secondary storage location separate from the primary storage location within the accessory device that stores the default language pre-recorded set of audio messages.

BRIEF DESCRIPTION OF THE DRAWINGS

FIG. 5 illustrates another logic flow describing an aspect of the method according to one embodiment of the invention.

DETAILED DESCRIPTION OF THE INVENTION

Figures 1, 2:
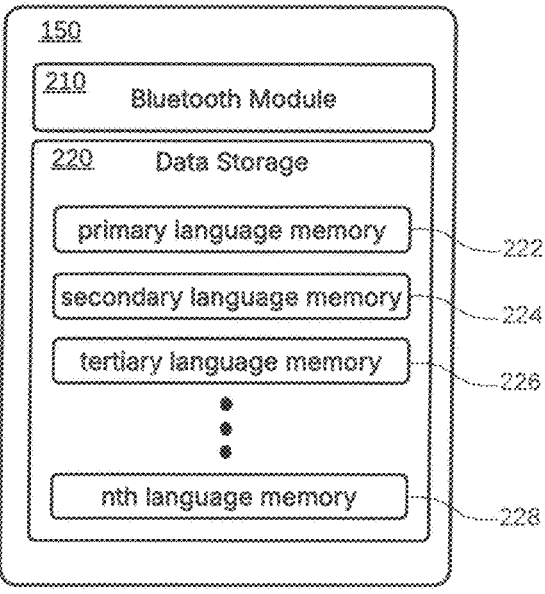
FIG. 1 illustrates a portable communication device (PCD) operatively coupled with a remote speaker/microphone assembly according to one embodiment of the invention.
FIG. 2 illustrates some internal components of remote the speaker/microphone assembly according to one embodiment of the invention.

The present invention relates to techniques and methods for syncing the languages of a Bluetooth accessory device to that of a primary device to which the Bluetooth accessory is paired. In an embodiment, the Bluetooth accessory device may be a remote speaker/microphone (RSM) configured to provide the audio in/out functions for a primary device to which it is paired and connected. In this embodiment, the primary device may be a portable communication device (PCD) that is configured to communicate with a cloud based or remote server within a network environment such as, for instance, the Internet. Typically, the PCD is a wireless device and includes RF circuitry to communicate over one or more RF protocols such as, for instance, cellular and/or WiFi (i.e., 802.11x)

In operation, the accessory (RSM) is preloaded with one or more pre-recorded audio messages that are played when triggered by a triggering event. The pre-recorded audio messages are associated with triggering events and typically provide information to the user regarding the status of the accessory device. Examples of pre-recorded audio messages may include one ore more variations of "power on", "power off", "battery high", "battery low", "device paired with", "connected", and/or "disconnected". This list is neither exhaustive nor exact. There may be other pre-recorded audio messages describing different statuses of the accessory device. Additionally, the exact wording of a pre-recorded audio message may differ from the examples above without altering the scope of what is disclosed herein.

These messages are in a default language (typically English). Thus, when these messages are played, the user may not understand the message if it is not in a language familiar to the user. Upon the initial power up trigger of the accessory, it may play the pre-recorded message "RSM powered on, battery level high" in English. Thereafter, the accessory (RSM) and primary (PCD) may undergo a language synchronization process designed to ensure that the language associated with the PCD becomes the 'native' language of the accessory. This means that the PCD queries the RSM to determine what language is associated with the set of pre-recorded audio messages on the RSM. If it is different from the language associated with the PCD, the PCD will obtain a new set of pre-recorded audio messages in the language associated with the PCD and forward them to the RSM. The RSM may then store these additional pre-recorded audio messages in the non-default language in a secondary memory space within the RSM. Thereafter, anytime there is a triggering event that causes one of the pre-recorded audio messages to play, it will play in the language preferred by the user. For example, when the triggering event for a low battery occurs, RSM may output the pre-recorded audio message in response to the trigger as "Bateria baja".

From time to time, the PCD may be re-assigned to another user that may have a different language preference from the last user. In that case, the sync process will discover any language discrepancy when it is paired to and establishes a connection with a different primary device (PCD) and it will reset or overwrite the secondary memory space with a new set of pre-recorded audio messages. Sometimes the primary device will remain the same but a user profile associated with the device may change that results in a different language associated with the primary device. In such cases, the sync process may discover any language discrepancy again and will reset or overwrite the secondary memory space with a new set of pre-recorded audio messages.

FIG. 1 illustrates a portable communication device (PCD) 100 and a remote speaker/microphone (RSM) 150 assembly according to one embodiment of the invention. PCD 100 may comprise a speaker component 110, a display component 120, an operational button 130, and a set of indicator lights 135. PCD 100 may further comprise a cable port (e.g., USB type) 140. Additionally, PCD 100 includes internal circuitry and components such as processors, wireless RF chipsets including a Bluetooth chipset, and other sensors (not shown) as well as a battery component to power the PCD 100. Similarly, RSM 150 may comprise a speaker component 160, microphone component(s) 170, an operational button 180, and a cable port 190. Additionally, RSM 150 includes internal circuitry and components such as processors, wireless RF chipsets including a Bluetooth chipset, and other sensors (not shown) as well as a battery component to power the RSM 150.

A wireless Bluetooth connection 125 may be utilized to communicably couple the PCD 100 and the RSM 150. Bluetooth connectivity allows for transferring data between PCD 100 and RSM 150. Alternatively, a USB link 145 may be utilized to communicably couple the PCD 100 and the RSM 150 via cable ports 140 and 190.

In normal operation, the PCD 100 is the primary communication device having RF connectivity to a remote cloud-based network for purposes of exchanging messages and data with the network and/or other PCDs via the network. Because the PCD 100 may be utilized in many different environments, the use of an accessory such as the RSM 150 often makes sense. The RSM 150 may provide enhanced audio characteristics for the speaker and microphone that are superior to the native speaker and microphone(s) of the PCD 100. Thus, an RSM 150 is often paired with a PCD 100 to provide a superior user experience.

FIG. 2 illustrates some internal components of RSM 150 according to one embodiment of the invention. A simplified view of RSM 150 also illustrates a Bluetooth module 210 and a data storage component 220. Data storage component 220 may be partitioned may ways including a primary language memory 222, a secondary language memory 224, a tertiary language memory 226 up to an nth language memory 228. Multiple language memories are implementable on the relatively limited memory RSM 150 because of the compression capabilities of the codec used. The techniques used to determine which languages occupy the various language memories are detailed below.

Figure 3:
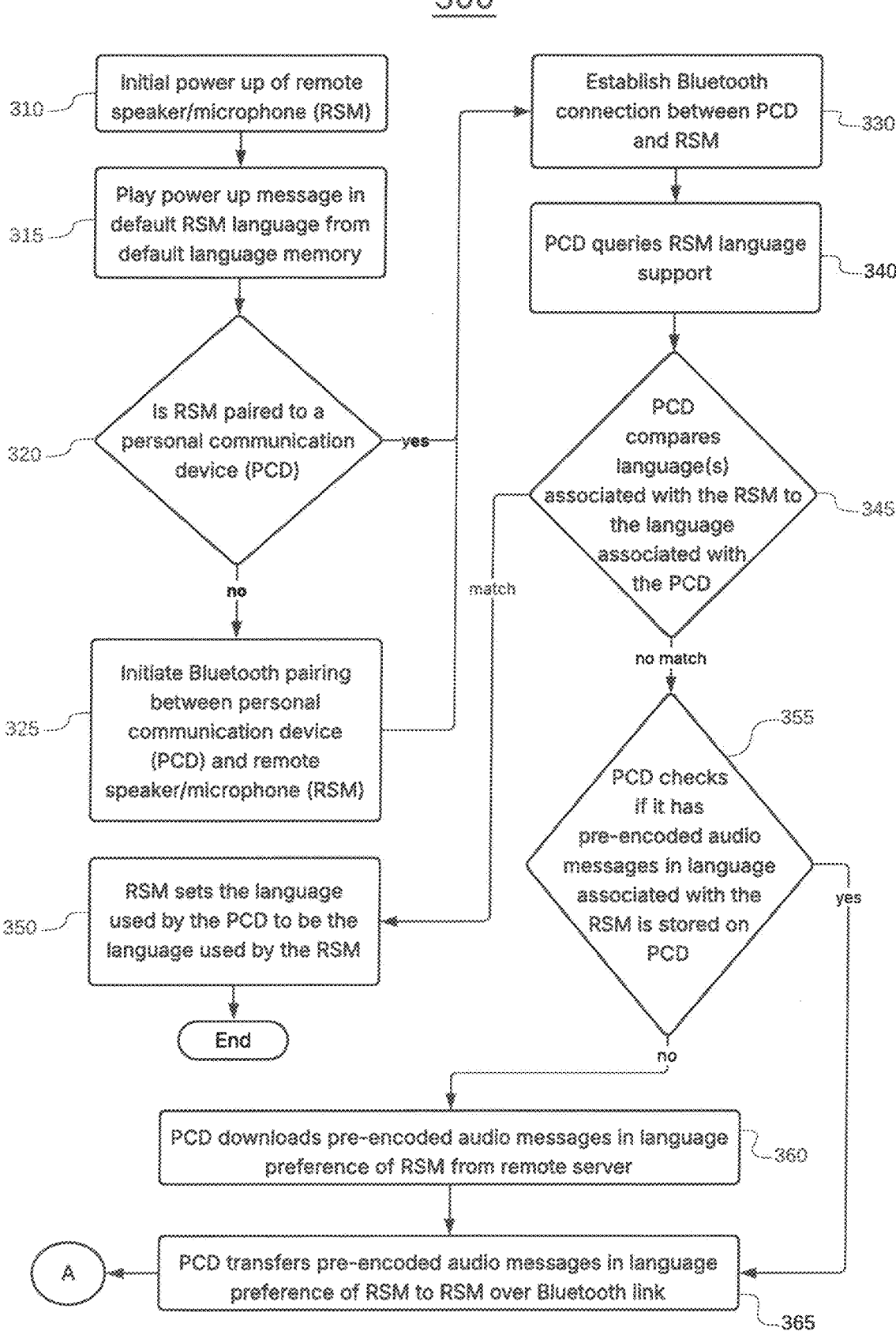
FIG. 3 illustrates a first logic flow describing the method according to one embodiment of the invention.

FIG. 3 illustrates a first logic flow 300 describing the method according to one embodiment of the invention, specifically a Bluetooth implementation. The process begins when a user powers up an RSM 150 at step 310. RSM 150 may then play a power up message in a default RSM language from default language memory at step 315. For instance, RSM 150 may output the message "RSM powered on, battery level high" to inform the user that the RSM device is now on and has a particular battery status. This message may be played from default language memory in the default language associated with RSM 150. RSM 150 then checks to see if it is paired via Bluetooth 125 with a PCD 100 at decision step 320. If there is already a Bluetooth pairing to the PCD 100, control jumps to step 330. If there is not a current pairing, RSM 150 initiates a Bluetooth pairing with the PCD 100 at step 325. The result of the Bluetooth pairing is the establishment of a Bluetooth connection 125 between the RSM 150 and the PCD 100 at step 330.

Once the Bluetooth connection 125 is established, PCD 100 queries RSM 150 to determine which language the RSM 150 supports at step 340. Upon receiving the results of the language query, PCD 100 compares the language(s) associated with the RSM 150 to the language associated with the PDC 100 at decision step 345. If there is a match between the language setting for the PCD 100 and one of the already stored languages on the RSM 150, the RSM sets the language used by the PCD 100 as the language to be used by the RSM 150 in step 350.

If there are no matches in the language settings between the PCD 100 and RSM 150, the PCD 100 checks if it has stored pre-encoded audio messages in the language associated with the RSM 150 in decision step 350. If PCD 100 does not have stored pre-encoded audio messages in the language associated with the RSM 150, PCD 100 downloads pre-encoded audio messages in the language associated with the RSM 150 at step 360 before advancing to step 365. If PCD 100 does have stored pre-encoded audio messages in the language associated with the RSM 150, control of the process jumps to step 365. In step 365, PCD 100 transfers pre-encoded audio messages in the language associated with the RSM 150 to the RSM 150 over Bluetooth link 125.

Figure 4:
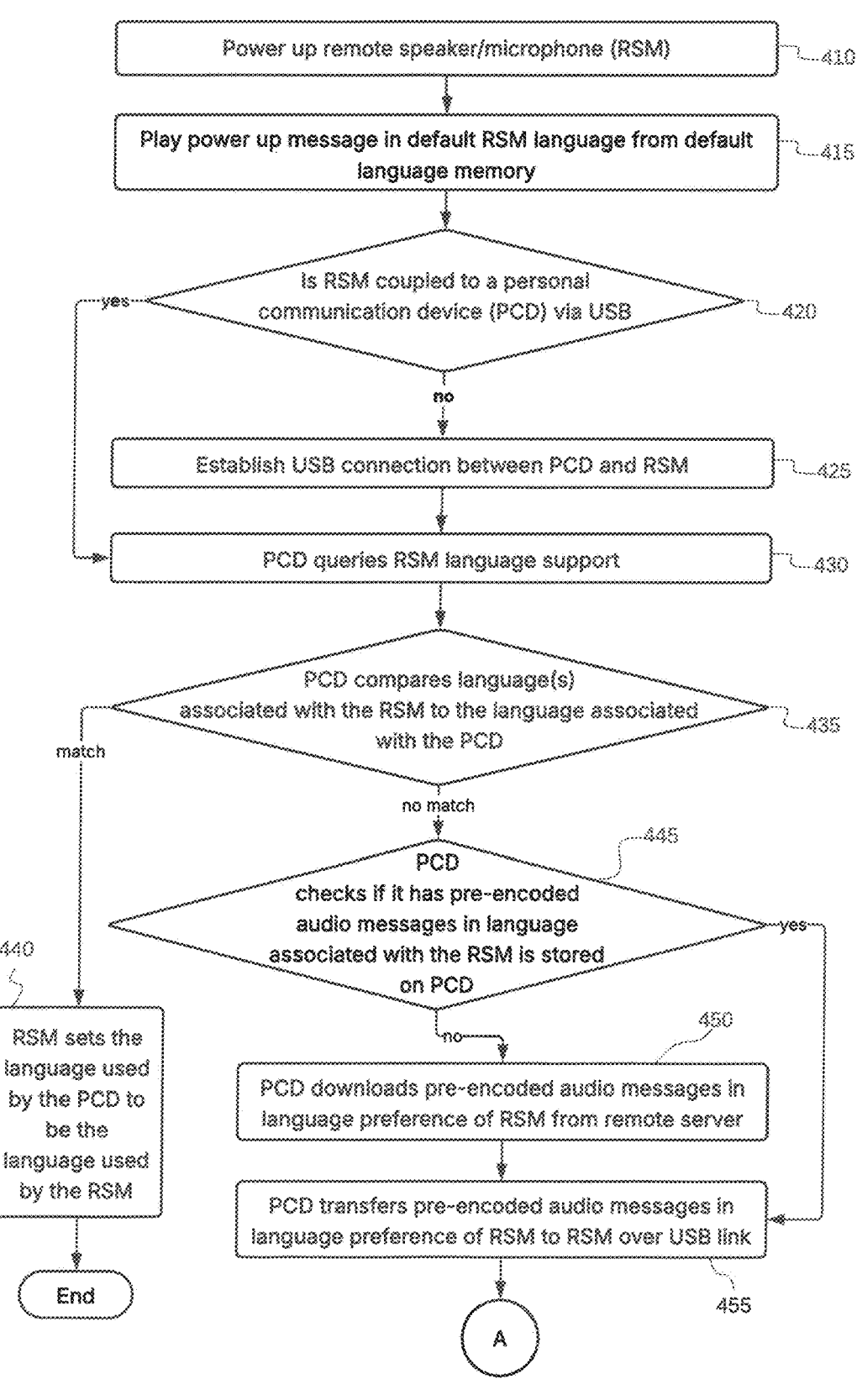
FIG. 4 illustrates a second logic flow describing the method according to one embodiment of the invention.

FIG. 4 illustrates a second logic flow 400 describing the method according to one embodiment of the invention, specifically a USB cable implementation. Much of the process is the same as that described for FIG. 3.

The process begins when a user powers up an RSM 150 at step 410. RSM 150 may then play a power up message in a default RSM language from default language memory at step 415. For instance, RSM 150 may output the message "RSM powered on, battery level high" to inform the user that the RSM device is now on and has a particular battery status. This message may be played from default language memory in the default language associated with RSM 150. RSM 150 then checks to see if it is paired via a USB link 145 with a PCD 100 at decision step 420. If there is already a USB link 145 to the PCD 100, control jumps to step 430. If there is not a current pairing, RSM 150 establishes a USB link 145 with the PCD 100 (e.g., connects a USB cable to port 140 of PCD 100 to port 190 of RSM 150) at step 425.

Once the USB link 145 is established, PCD 100 queries RSM 150 to determine which language the RSM 150 supports at step 430. Upon receiving the results of the language query, PCD 100 compares the language(s) associated with of the RSM 150 to the language associated with of the PDC 100 at decision step 435. If there is a match between the language setting for the PCD 100 and one of the already stored languages on the RSM 150, the RSM sets the language used by the PCD 100 as the language to be used by the RSM 150 in step 440.

If there are no matches in the language settings between the PCD 100 and RSM 150, the PCD 100 checks if it has stored pre-encoded audio messages in the language associated with the RSM 150 in decision step 445. If PCD 100 does not have stored pre-encoded audio messages in a language associated with the RSM 150, PCD 100 downloads pre-encoded audio messages in the language associated with the RSM 150 at step 450 before advancing to step 455. If PCD 100 does have stored pre-encoded audio messages in a language associated with the RSM 150, control of the process jumps to step 455. In step 455, PCD 100 transfers pre-encoded audio messages in the language associated with the RSM 150 to the RSM 150 over USB link 145.

FIG. 5 illustrates another logic flow 500 describing an aspect of the method according to one embodiment of the invention. Specifically, logic flow 500 describes the techniques used to determine which languages occupy the various language memory locations illustrated in FIG. 2.

FIG. 5 picks up from the point where FIGS. 3 and 4 end, namely after PCD 100 transfers pre-encoded audio messages in the language associated with the RSM 150 to the RSM 150 over either the Bluetooth link 125 or USB link 145. RSM 150 may be pre-loaded with multiple languages in different language memory locations (1-n) within the RSM 150. For instance, there may be seven (n=7) language memory locations within RSM 150 each capable of storing pre-encoded audio messages in a particular language. There may be 3-4 commonly used languages like English, Spanish, French, or Japanese. Each RSM 150 may store the pre-encoded audio messages in these languages in language memory locations 1 through 4 leaving language memory locations 5 through 7 unused. Thus, when a user, via the profile currently associated with the PCD 100, prefers Chinese, the RSM has the ability to obtain and store on the RSM 150 the pre-encoded audio messages in Chinese.

Step 510 indicates that RSM 150 is pre-loaded with pre-encoded audio messages in a default language (e.g., English) likely stored in language memory location 1 that may be characterized as the fixed default language memory location. Thus, the pre-encoded audio messages in this language memory location may not be changed. In addition, a few other commonly used languages may be pre-loaded with the same pre-encoded audio messages in subsequent language memory locations. When pre-encoded audio messages in a language not currently supported by RSM 150 are downloaded to the RSM 150, the RSM 150 determines if there are any unused language memory locations available in decision step 520. If there are any unused language memory locations available, RSM 150 stores the pre-encoded audio messages in the next available language memory location in step 530. Thereafter, the RSM 150 sets the language in use by the PCD 100 to be the language used by the RSM 150 when playing pre-encoded messages in step 560.

If there are not any unused language memory locations available, RSM 150 selects which language memory location to overwrite in step 540. For instance, RSM 150 may select from among all the language memory locations except for the default language memory location which remains fixed. One selection criteria may entail determining which language memory location has been the least used. For instance, a counter mechanism may be incremented each time a language memory location is put into use. Whichever language memory location has the lowest counter number may be selected to be overwritten. Another criteria may be to select the language memory location to be overwritten that has been dormant for the longest period of time. Yet another criteria may be to select the language memory location to be overwritten on a first-in-first-out (FIFO) scheme.

RSM 150 then stores the pre-encoded audio messages in the language memory location to be overwritten in step 550. Thereafter, the RSM 150 sets the language in use by the PCD 100 to be the language used by the RSM 150 when playing pre-encoded messages in step 560.

Figure 6:
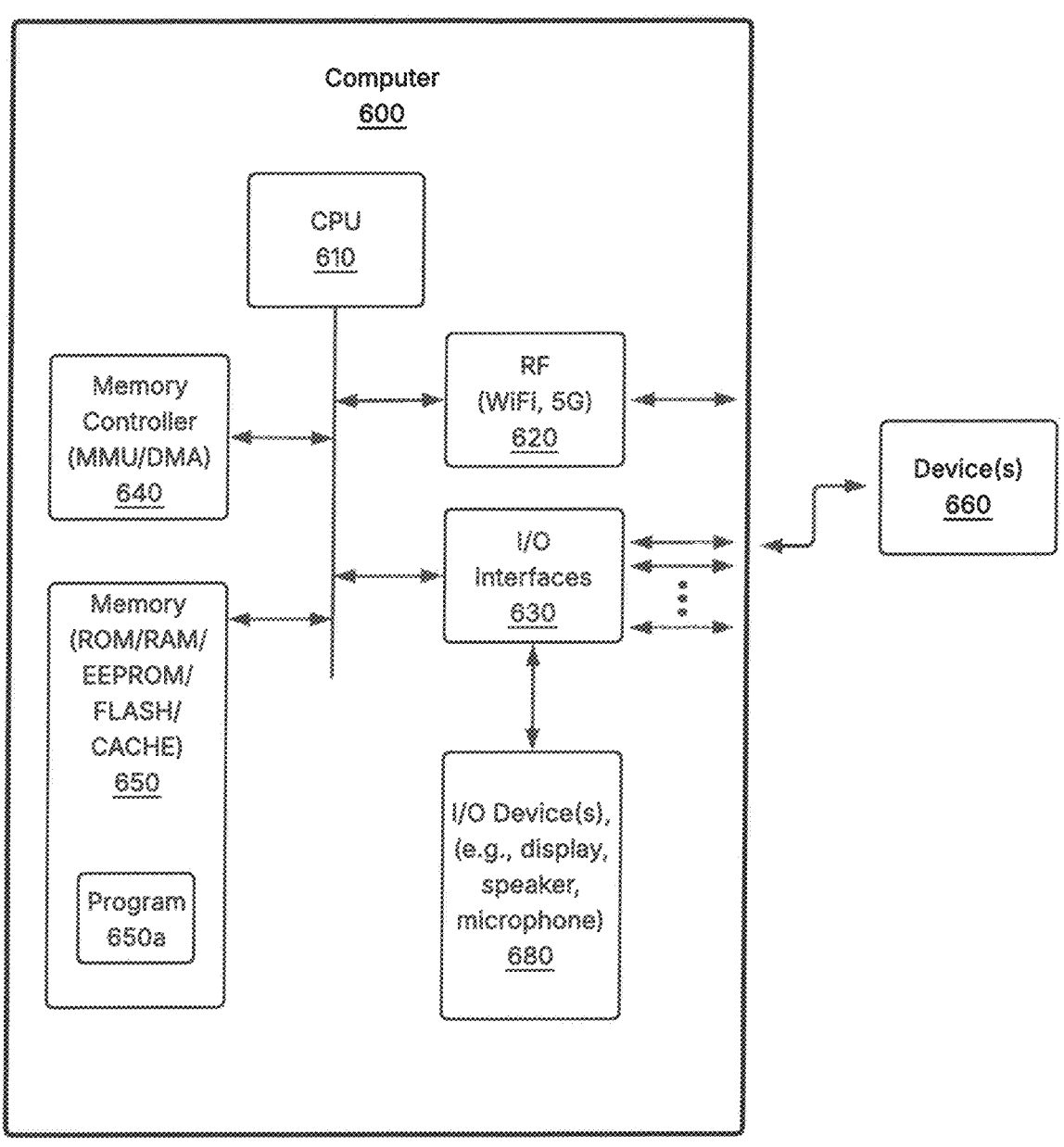
FIG. 6 illustrates an example system and components according to an embodiment of the invention.

FIG. 6 illustrates an example system and components according to an embodiment of the invention. It will be readily understood that certain embodiments can be implemented using any of a wide variety of devices or combinations of devices and components. In FIG. 6 an example of a computer 600 and its components are illustrated, which may be used in a device such as RSM 150 or PCD 100 for implementing certain of the functions or acts described herein, e.g., executing a profile-based configuration or other described applications, embodied in program 550*a*, in turn implementing acts or subsets thereof of FIGS. 3 and 4. Also, circuitry other than that illustrated in FIG. 5 may be utilized in one or more embodiments. The example of FIG. 5 includes certain functional blocks, as illustrated, which may be integrated onto a single semiconductor chip to meet specific application requirements.

One or more processing units are provided, which may include a central processing unit (CPU) 610, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 610 may comprise a single integrated circuit comprising several units, the design and arrangement of which vary according to the architecture chosen.

Computer 600 also includes a memory controller 640, e.g., comprising a direct memory access (DMA) controller to transfer data between memory 550 and hardware peripherals. Memory controller 640 includes a memory management unit (MMU) that functions to handle cache control, memory protection, and virtual memory. Computer 600 may include controllers for communication using various communication protocols (e.g., I²C, USB, etc.).

Memory 650 may include a variety of memory types, volatile and nonvolatile, e.g., read only memory (ROM), random access memory (RAM), electrically erasable programmable read only memory (EEPROM), Flash memory, and cache memory. Memory 650 may include embedded programs, code, and software, e.g., program 650*a*, that provides coded methods such as illustrated and described in connection with FIGS. 3 and 4. By way of example, and not limitation, memory 650 may also include an operating system, application programs, other program modules, code, and program data, which may be downloaded, updated, or modified via remote devices.

A system bus permits communication between various components of the computer 600. I/O interfaces 630 and radio frequency (RF) devices 620, e.g., Wi-Fi and telecommunication radios, near field communication modules, etc., may be included to permit computer 600 to send data to and receive data from remote devices using wireless mechanisms, noting that data exchange interfaces for wired data exchange may be utilized. Computer 600 may operate in a networked or distributed environment using logical connections to one or more other remote computers or devices 660, for example in a system comprising a CPS and a set of PCDs. The logical connections may include a network, such local area network (LAN) or a wide area network (WAN) but may also include other networks/buses. For example, computer 600 may communicate data with and between device (s) 660.

Computer 600 may therefore execute program instructions or code configured to provide CPS and/or PCD functionality and perform other functionality of the embodiments. A user can interface with (for example, enter commands and information) the computer 600 through input devices, which may be connected to I/O interfaces 630. A display or other type of I/O device 680 may be connected to or integrated with the computer 600, for example via an interface selected from I/O interfaces 630.

It should be noted that the various functions described herein may be implemented using instructions or code stored on a memory, e.g., memory 650, that are transmitted to and executed by a processor, e.g., CPU 510. Computer 600 includes one or more storage devices that persistently store programs and other data. A storage device or computer readable medium, as used herein, is a non-transitory computer readable medium. Some examples of a non-transitory computer readable medium include, but are not limited to, storage integral to computer 600, such as memory 650, a hard disk or a solid-state drive, and removable storage, such as an optical disc or a memory stick. Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for synchronizing a language associated with a Bluetooth enabled primary wireless portable device with a language associated with a set of pre-recorded audio messages stored on a Bluetooth accessory device, comprising:

a Bluetooth enabled primary portable device; and a Bluetooth enabled accessory device, the accessory device including a plurality of storage locations wherein a set of pre-recorded audio messages in a default language are stored in a primary storage location and the accessory device configured to store one or more sets of pre-recorded audio messages in different languages in the remaining plurality of storage locations;

wherein the primary portable device:

establishes a connection with an accessory device;

queries the accessory device to determine what languages are associated with the set of pre-recorded audio messages stored on the accessory device;

compares the languages associated with a set of pre-recorded audio messages stored on the accessory device with a language associated with the primary portable device to determine if at least one of the languages supported by the accessory device matches the language associated with the primary portable device;

when there is a match between one of the languages supported by the accessory device and the language associated with the primary portable device, configures the accessory device to use the set of pre-recorded audio messages in the language associated with the primary portable device;

when there is no match between the languages supported by the accessory device and the language associated with the primary portable device:

obtains a set of pre-recorded audio messages in the language associated with the primary portable device;

forwards the set of pre-recorded audio messages in the language associated with the primary portable device to the accessory device;

in the accessory device:

receives the set of pre-recorded audio messages in the language associated with the primary portable device;

stores the set of pre-recorded audio messages in the language associated with the primary portable device in a storage location within the accessory device; and configures the accessory device to use the set of pre-recorded audio messages in the language associated with the primary portable device.

2. The system of claim 1, wherein the accessory device:

determines whether there is an unused storage location available;

when there is an unused storage location available, stores the set of pre-recorded audio messages in the language associated with the primary portable device in the unused storage location within the accessory device; and when there is not an unused storage location available, selects one of the storage locations to be overwritten.

3. The system of claim 2, wherein when selecting one of the storage locations to be overwritten, the accessory device:

determines which language memory storage location has been the least used; and overwrites the least used language memory storage location with the set of pre-recorded audio messages in the language associated with the primary portable device.

4. The system of claim 2, wherein when selecting one of the storage locations to be overwritten, the accessory device:

determines which language memory storage location has not been used for the longest time; and overwrites the memory storage location that has not been used for the longest time with the set of pre-recorded audio messages in the language associated with the primary portable device.

5. The system of claim 1, wherein the pre-recorded audio messages are associated with triggering events and provide information regarding the status of the accessory device.

6. The system of claim 5, wherein the accessory device plays the pre-recorded audio messages in the language associated with the primary portable device when a triggering event occurs.

7. The system of claim 1, wherein the connection resulting from establishing a connection with an accessory device is a Bluetooth connection.

8. The system of claim 1, wherein the connection resulting from establishing a connection with an accessory device is a direct cable connection between the primary portable device and the accessory device.

9. The system of claim 1, further comprising:

prior to being able to establish a Bluetooth connection between the primary portable device and the accessory device, initially pairing the primary portable device with the accessory device.

10. The system of claim 1, wherein the primary portable device is a Bluetooth enabled battery powered portable communication device (PCD).

11. The system of claim 1, wherein the accessory device is a Bluetooth enabled battery powered remote speaker/microphone (RSM) device.

12. A non-transitory computer-readable medium comprising program instructions for synchronizing a language associated with a Bluetooth enabled primary wireless portable device with a language associated with a set of pre-recorded audio messages stored on a Bluetooth accessory device, the instructions executable by one or more processors to cause the processors to:

establish a Bluetooth connection with an accessory device, wherein the accessory device includes a plurality of storage locations wherein a set of pre-recorded audio messages in a default language are stored in a primary storage location and the accessory device configured to store one or more sets of pre-recorded audio messages in different languages in the remaining plurality of storage locations;

query the accessory device to determine what languages are associated with the set of pre-recorded audio messages stored on the accessory device;

compare the languages associated with a set of pre-recorded audio messages stored on the accessory device with a language associated with the primary portable device to determine if at least one of the languages supported by the accessory device matches the language associated with the primary portable device;

when there is a match between one of the languages supported by the accessory device and the language associated with the primary portable device, configure the accessory device to use the set of pre-recorded audio messages in the language associated with the primary portable device;

when there is no match between the languages supported by the accessory device and the language associated with the primary portable device:

obtain a set of pre-recorded audio messages in the language associated with the primary portable device;

forward the set of pre-recorded audio messages in the language associated with the primary portable device to the accessory device;

in the accessory device:

receive the set of pre-recorded audio messages in the language associated with the primary portable device;

store the set of pre-recorded audio messages in the language associated with the primary portable device in a storage location within the accessory device; and configure the accessory device to use the set of pre-recorded audio messages in the language associated with the primary portable device.

13. The non-transitory computer-readable medium of claim 12, the instructions executable by one or more processors to cause the processors to:

determine whether there is an unused storage location available;

when there is an unused storage location available, store the set of pre-recorded audio messages in the language associated with the primary portable device in the unused storage location within the accessory device; and when there is not an unused storage location available, select one of the storage locations to be overwritten.

14. The system of claim 2, the instructions executable by one or more processors to cause the processors to:

determine which language memory storage location has been the least used; and overwrite the least used language memory storage location with the set of pre-recorded audio messages in the language associated with the primary portable device.

15. The system of claim 13, the instructions executable by one or more processors to cause the processors to:

determine which language memory storage location has not been used for the longest time; and overwrite the memory storage location that has not been used for the longest time with the set of pre-recorded audio messages in the language associated with the primary portable device.

16. The non-transitory computer-readable medium of claim 12, wherein the pre-recorded audio messages are associated with triggering events and provide information regarding the status of the accessory device.

17. The non-transitory computer-readable medium of claim 16, the instructions executable by one or more processors to cause the processors to play the pre-recorded audio messages in the language associated with the primary portable device when a triggering event occurs.

\*    \*    \*    \*    \*